United States Patent [19]

Stark

[11] 4,358,228
[45] Nov. 9, 1982

[54] MACHINE TOOL

[76] Inventor: Gerhard Stark, Beethoverstr. 21, 7312 Notzingen, Fed. Rep. of Germany

[21] Appl. No.: 186,592

[22] Filed: Sep. 12, 1980

[30] Foreign Application Priority Data

Sep. 12, 1979 [DE] Fed. Rep. of Germany ....... 2936785

[51] Int. Cl.³ .......................... B23B 39/20; B23G 1/20
[52] U.S. Cl. ........................................ 408/35; 408/129
[58] Field of Search .................. 408/133, 129, 35, 31, 408/8, 88

[56] References Cited

U.S. PATENT DOCUMENTS

| 2,023,841 | 12/1935 | Kingsbury | 408/129 X |
| 3,074,147 | 1/1963 | Miller et al. | 408/35 |
| 3,413,702 | 12/1968 | Burg | 408/35 X |
| 4,041,588 | 8/1977 | Kuttnert | 408/35 X |
| 4,103,405 | 8/1978 | Blum et al. | 408/35 X |
| 4,135,278 | 1/1979 | Kitamura | 408/35 X |

FOREIGN PATENT DOCUMENTS

| 2057928 | 4/1981 | United Kingdom | 408/35 |
| 286455 | 8/1971 | U.S.S.R. | 408/35 |

Primary Examiner—William R. Briggs
Assistant Examiner—Paul M. Heyrana, Sr.
Attorney, Agent, or Firm—Michael J. Striker

[57] ABSTRACT

A machine tool has a table, a standard, a head part displaceable on the standard relative to the table, a main spindle arranged in the head part, an electric motor arranged in the head part for driving the main spindle in rotation, a tool changing arrangement arranged in the head part for aligning and coupling a tool with the main spindle, and a rotary element for displacing the head part relative to the table, which rotary element is arranged so that it is rotated by the electric motor and displaces, during the rotation, the head part relative to the table.

22 Claims, 3 Drawing Figures

MACHINE TOOL

BACKGROUND OF THE INVENTION

The present invention relates to a machine tool. More particularly, it relates to a machine tool which has a table, a standard, a head part which moves on the standard relative to the table and accommodates a main spindle, an adjustable electric motor for driving the main spindle, and a tool changing arrangement including a tool transporting wheel adapted to align and couple the tool holder with the main spindle.

The machine tools of the above-described general type are known in the art. In a known revolving drilling machine tool described in the German Offenlegungsschrift No. 2,741,802, the tool holder is formed as a spindle gearing unit. With the introduction of the DC electric motor, only few spindle gearing units can be utilized, despite a wide range of rotational speeds. The head part is moved by its own drive unit. The known machine tools of this type possess some disadvantages in that they have a relatively complicated construction.

SUMMARY OF THE INVENTION

Accordingly, it is an object of the present invention to provide a machine tool which avoids the disadvantages of the prior art.

More particularly, it is an object of the present invention to provide a machine tool of the above-described type which has the same capacity and at the same time has considerably simpler construction, as compared with the known machine tools.

In keeping with these objects and with others which will become apparent hereinafter, one feature of the present invention resides in that means for displacing a head part of the machine tool relative to the table is provided which displacing means is arranged so that they are rotated by an electric motor which is utilized for rotating a main spindle, and the displacing means displaces the head part relative to the table during the rotation of the displacing means.

The displacing means includes a rotary element which is rotated by the electric motor and displaces the head part relative to the table. The rotary element may be connected with the electric motor by a toothed belt, and a coupling may be provided which connects the rotary element with the electric motor via intermediate parts.

When the machine tool is designed in accordance with the present invention, the electric motor is utilized not only for driving the main spindle in rotation, but also for the displacement of the head part. Thereby the construction of the machine tool is considerably simplified, an additional motor and a special transmission or additional hydraulic elements are no longer necessary.

In accordance with another feature of the present invention, the rotary element is formed as a self-locking threaded spindle which is arranged in the head part rotatable and axially immovable and extends through a nut fixedly mounted on the standard. A toothed belt pulley is arranged on the threaded spindle, and the threaded belt is arranged on the belt pulley and the electric motor. In accordance with one embodiment of the invention, the toothed belt pulley is arranged rotatable on the threaded spindle, and an electromagnetic coupling is utilized as a coupling between the toothed belt pulley and the threaded spindle. In accordance with another embodiment of the invention, the coupling is arranged on the drive shaft of the electric motor, and the rotation of the electric motor can be selectively transmitted to the main spindle or to the threaded spindle.

In accordance with still another feature of the present invention, the electric motor is formed as a servomotor with permanent magnetic fields, and is controllable in dependence upon the number of revolutions and the angular position of the drive shaft in the inoperative position.

In accordance with a further feature of the present invention, the electric motor with the utilization of respective couplings drives not only the main spindle and the rotary element for the head part, but also the tool transporting wheel of the tool changing arrangement. Thereby, the single electric motor is utilized for performing the above-mentioned three movements, namely for driving the main spindle, for rotating the drum or the like of the tool changing arrangement, and for the basic adjustment of the head part. This not only simplifies the mechanical construction of the machine tool but also favorably influences the electrical control and programming of the same. The electric motor, as well an electric motor for the tool feed are provided with numerical control.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
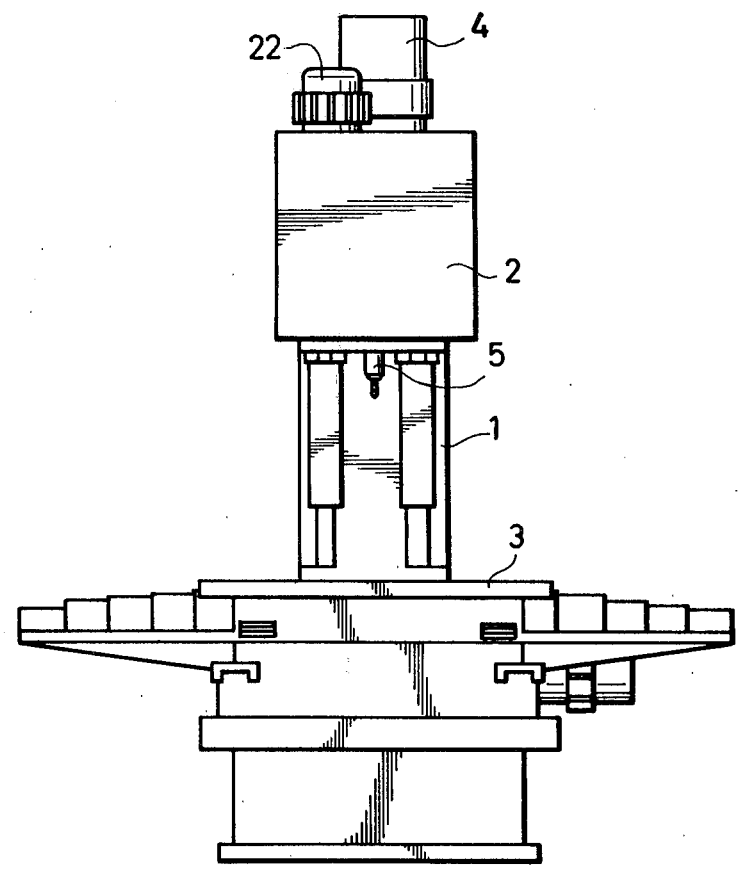
FIG. 1 is a front view of the machine tool in accordance with the present invention.

The machine tool in accordance with the present invention has a standard 1 and a head part 2 which is movable upwardly and downwardly on the standard relative to a table 3. A DC electric motor 4, a main spindle 5, a feed drive 6, a tool changing arrangement 7 with a tool transporting wheel 8 and a rotary element 9 for upward and downward movement of the head part 2 as well as transmission parts, are arranged in the head part 2.

Figure 2:
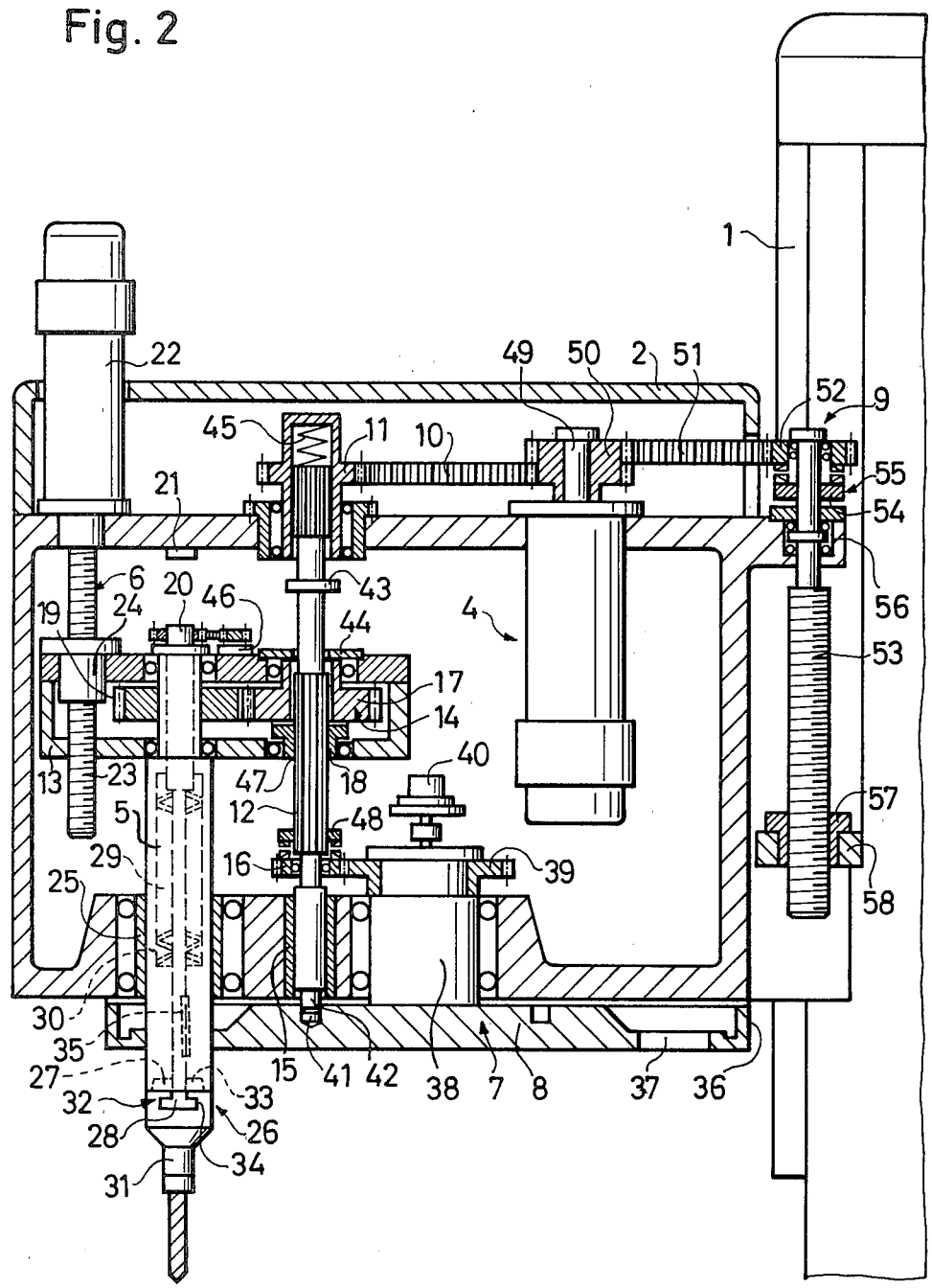
FIG. 2 is a section of a head part of the machine tool in accordance with one embodiment of the present invention.

The machine tool shown in FIG. 2 is formed as a machining center. The electric motor is formed here as a field excited DC electric motor with, for example, 11 KW and 400 U/min (respectively reduced). The electric motor 4 drives a drive gear 11 via a toothed belt 10. The drive gear 11 is supported axially immovably in the head part 2. A splined shaft 12 is axially immovably received in the drive gear 11.

The splined shaft 12 extends through a housing block 13 and through a coupling gear 14 which is axially immovably supported in the housing block 13. Then, the splined shaft 12 extends through a bushing 15 in the head part 2 and carries a gear 16 which serves as a driver for the drive of the tool transporting gear 8. The coupling gear 14 is formed as a gear wheel 17 and mounted loosely on the splined shaft 12. It can engage with the splined shaft 12 via a coupling 18 which is preferably electromagnetically operated.

The main spindle 5 is rotatably supported in the housing block 13. A gear 19 is arranged on the main spindle 5 for joint rotation with and axially immovable relative to the same. The gear 19 meshes with the gear 17. The main spindle 5 extends with its free end 20 outwardly beyond the housing block 13 and can displace toward a fixed abutment 21 of the head part 2. The housing block 13 with the gears 17 and 19 and the main spindle 5 is axially displaceable via the feed drive 6. A servo DC electric motor 22 rotates a feed spindle 23 which engages in a feed nut 24 connected with the housing block 13.

The main spindle 5 is rotatably supported in the housing block 13 and also in a supporting bushing 25 of the head part 2. It is axially displaceable together with the housing block 13. The main spindle 5 carries at its free end a coupling part 26 which is composed of a centering cone 27 and a holding member 28. The holding member 28 has T-shaped end portion and is pulled inwardly by a displacement element 29 formed as a plate spring pocket 30. A tool holder 31 is connectable with the main spindle 5. The tool holder 31 has at its end a coupling part 32 formed with a short taper 33 and a groove 34. The short taper 33 is fitted in the centering cone 27, and the T-shaped end portion of the holding member 28 is received in the groove 34. The holding member 28 which is axially movable in the main spindle 5 is connected for joint rotation with the latter by a wedge 35.

The tool holder 31 is incorporated in the tool transporting wheel 8 as important component of the tool changing arrangement 7. The tool transporting wheel 8 has a plurality of throughgoing openings 37 near its outer peripheral surface 36, and the tool holder 31 and the main spindle 5 can extend through the openings 37 in the working position. The tool transporting wheel 8 is axially immovably supported by its axle 38 in the head part 2. The axle 38 carries a gear 39 which meshes with the gear 16 on the splined shaft 12. A position sensing or indicating element 40 for indicating the position of the tool transport wheel 8 is located above the axle 38. The tool transporting wheel 8 has at its one end face a plurality of indexing openings 41 in which the lower end of the splined shaft 12 formed as an indexing pin 42 can engage in aligning condition.

The splined shaft 12 is provided with a shoulder 43 which can abut against a check plate 44. A switch spring 45 is arranged between an end face of the splined shaft 12 and the drive gear 11. The gear 16 is arranged rotatable on the splined shaft 12 and can be connected with the latter for joint rotation via a coupling 48 which is preferably formed as an electromagnetic coupling. In the position shown in FIG. 2, the tool transporting wheel 8 is fixed by the engagement of the indexing pin 42 in the indexing opening 41. The splined shaft 12 drives the coupling gear 14 via the coupling 18 and drives the main spindle 5 and the tool holder 31 in rotation. The main spindle 5 is thus coupled, whereas the tool transporting wheel 8 is uncoupled via the coupling 48. At the end of the machining process, the main spindle 5 is pulled back until its free end 20 abuts against the fixed abutment 21. Now the tool exchange can take place, when the main spindle 5 is so inserted into the head part 2 that the tool transporting wheel 8 can rotate and the indexing is released. However, the T-shaped end portion of the holding member 28 projects to such extent that the tool holder 31 with its short taper 33 is withdrawn from the centering cone 27. The main spindle 5 assumes a so-called "home" position and thus in an angular location, in which the groove 34 and the folding member 28 are so located that the tool holder 31 during the rotation of the tool transporting wheel 8 moves downwardly from the holding member 28. During the upward displacement of the housing block 13 via the feed drive 6, the splined shaft 12 is driven via the shoulder 43 by the check plate 44 so that the indexing pin 42 is withdrawn from the indexing opening 41 in the tool transporting wheel 8. Simultaneously, the rotary connection to the coupling gear 14 via the coupling 8 is interrupted, so that in the initial position the main spindle 5 is not driven. Thereby, the gear 16 meshes with the gear 39 via the coupling 48. When the electric motor 4 operates, the tool transporting wheel 8 rotates via the toothed belt 10, the drive gear 11, the splined shaft 12, a coupling 48, and the pair of gears 16 and 39, so that a new tool holder 31 can be brought into alignment with and under the main spindle 5. Thereby one should not rely upon a step-by-step switching, but can bring with the aid of the control any desirable tool holder 31 under the main spindle 5. When the selected tool holder 31 is transported to the region below the main spindle 5, the housing block 13 moves downwardly, the holding member 28 disengages from the fixed abutment 21, and the displacement element 29 pulls the tool holder 31 against the main spindle 5 so as to provide for coupling. The switch spring 45 allows the splined shaft 12 to follow the downwardly displacing housing block 13, until the indexing pin 42 engages in the opening 41.

A toothed belt pulley 50 is arranged on a drive shaft 49 of the electric motor 4. The toothed belt 10 and toothed belt 51 embrace the toothed belt pulley 50. The toothed belt 51 also embraces a toothed belt pulley 52 which is rotatably supported on a threaded spindle 53 and is connectable with the latter by a coupling 55 which is formed as an electromagnetic coupling 54. The threaded spindle 53 extends through a fixed support 56 of the head part 2. The threaded spindle 53 is rotatable relative to the support 56 but is axially immovable. The support 56 extends through a nut 57 which is supported in a bearing bracket 58 on the standard 1. When the threaded spindle 53 is actuated via the coupling 55 and the electric motor 4 rotates thereby the threaded spindle 53, the head part 2 displaces on the standard 1 upwardly or downwardly in dependence upon the direction of rotation. Thereby, basic adjustment of the head part 2 relative to the table 3 takes place.

Figure 3:
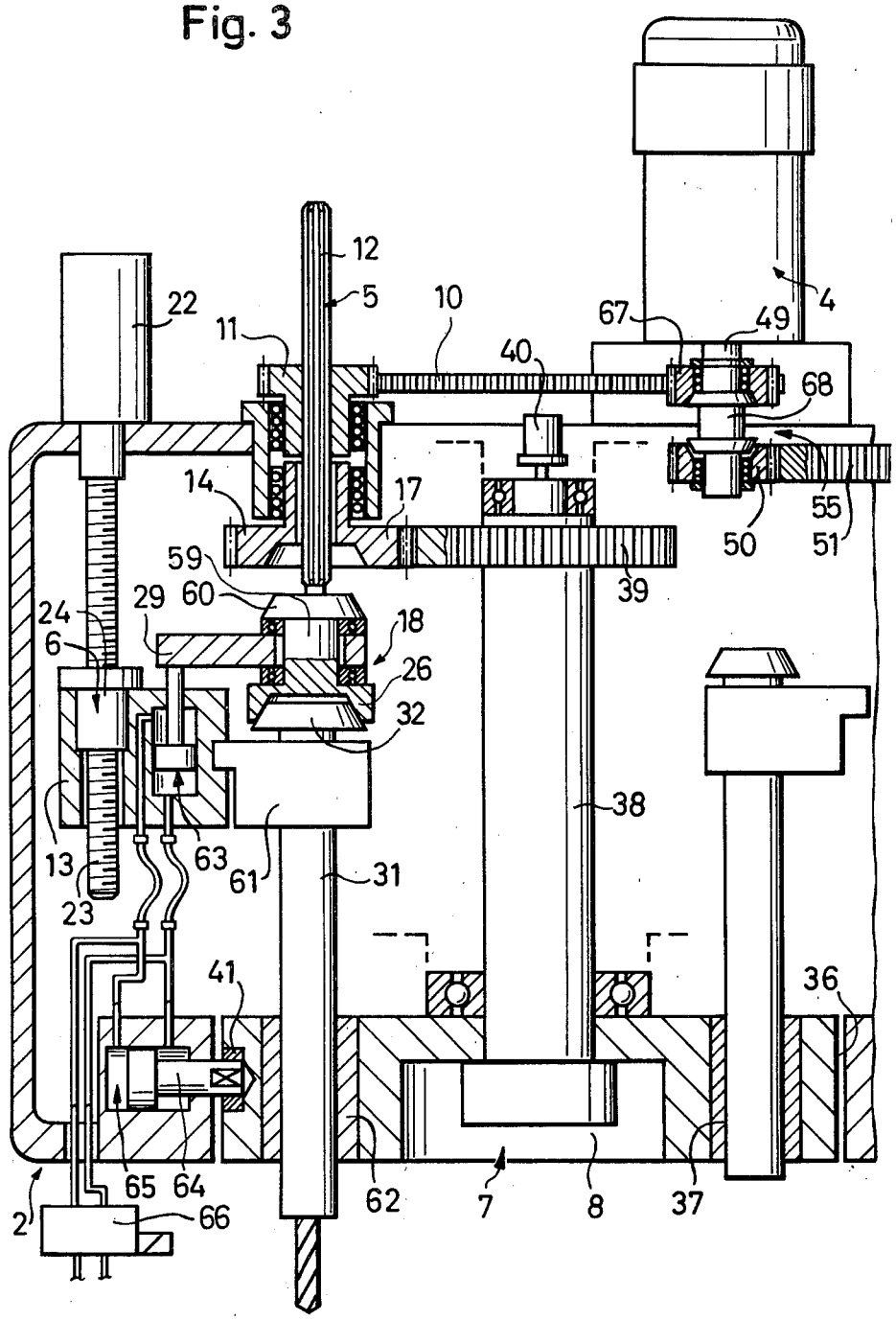
FIG. 3 is a section of the head part of the machine tool in accordance with another embodiment of the invention.

The machine tool shown in FIG. 3 is formed as a revolving drilling machine tool. The parts of this machine tool which correspond to the parts of the machine tool of FIG. 2 are identified by identical reference numerals. The main spindle 5 is here formed directly as a splined shaft 12. The drive gear 11 and the coupling gear 14 are arranged on the splined shaft 12. The coupling gear 14 is formed as the gear wheel 17 and drives the gear 39 arranged on the axle 38 so as to drive a tool transporting wheel 8 which is formed as a revolver.

A coupling element 59 is arranged on one end portion of the splined shaft 12. The coupling element 59 is provided with a coupling part 26, on the one hand, and with a coupling part 60, on the other hand, for connecting with the coupling gear 14. A tool holder 31 in this embodiment is composed of a toothed spindle holder with its transmission 61. The tool spindle holder axially moves via the feed drive 6 and is guided in a bushing 62 in the tool transporting wheel 8.

The coupling element 59 together with the main spindle 5 is axially displaceable via a hydraulic element 63 which is arranged in a housing block 13. A feed spindle nut 24 is received in the housing block 13. For indexing of the tool transporting gear 8, a pin 64 formed as a component of a further hydraulic element 65 engages in an indexing opening 41 which is here formed in the circumferential surface 36 of the revolver. The hydraulic elements 63 and 65 are jointly controllable, as shown, via a pilot valve 66.

In this embodiment, a coupling 55 is arranged on the drive shaft 49 of the electric motor 4. Here, the electric motor 4 is formed as DC servo-motor with a maximum power of, for example, between 7.5 and 15 KW and a maximum 2800 U/min. Such multipole motors with permanent magnetic field, have within an extremely wide range of speeds of rotation, an approximately constant torque, the thermal time constant amounting to more than 100 minutes, and the strong iron containing armature which can absorb the heat which is generated when over long time considerably high peak torques take place as nominal torques. The motor can be thereby designed only for approximately half of the maximum power as nominal power. Both toothed belt pulleys 50 and 67 are rotatably arranged on the drive shaft 49 and can be coupled via a sleeve 68. The sleeve 68 is connected with the drive shaft 49 for joint rotation and can be coupled with the toothed belt pulley 50 or the toothed belt pulley 67 in dependence upon its axial position. The rotary element 9 is not shown here, inasmuch as it is identical to that shown in FIG. 2.

FIG. 3 shows the machine tool in its working position. The head part 2 is adjusted at the exact height relative to the table 3 via the rotary element 9, and the sleeve 68 is displaced upwardly so that the toothed belt pulley 67 is connected for joint rotation with the drive shaft 49 of the electric motor 4. The feed drive 6 displaces the housing block 13 and thereby, via the displacing element 29, the main spindle 5 and the tool spindle holder downwardly, in order to carry out the machining of the not shown workpiece on the table 3. After this, the tool holder 31 and the main spindle 5 are displaced back via the feed drive 6. In a predetermined end position, the main spindle 5 with the coupling element 59 is further displaced upwardly via the hydraulic element 63, so that the connection between the main spindle 5 and the tool holder 31 is interrupted and finally the coupling part 6 engages into the coupling gear 14. Now the tool transporting wheel 8 is rotated via the pair of gears 17 and 39. With the hydraulic element 63, the hydraulic element 65 is driven into action so that the pin 46 is withdrawn and the indexing is interrupted. Thereby a new tool holder 31 can be brought in aligning position with the main spindle 5 in which the coupling element 59 displaces downwardly via the hydraulic element 63. The coupling between the main spindle 5 and the tool holder 31 thereby takes place, and the tool changing arrangement is uncoupled. The hydraulic element 65 moves the pin 64 so that it again engages in the indexing opening 41.

It will be understood that each of the elements described above, or two or more together, may also find a useful application in other types of constructions, differing from the types described above.

While the invention has been illustrated and described as embodied in a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A machine tool, comprising a table; a standard; a head part; a main spindle mounted in said head part and having an axis; an electric motor in said head part for driving said main spindle in rotation; a tool changing device mounted in said head part for holding a tool holder carrying a tool, said tool holder being coupled to said main spindle; means for displacing said head part on said standard relative to said table, said displacing means including a rotary element rotated by said electric motor and adapted to displace said head part relative to said table; and a plurality of transmitting means for transmitting the rotation of said electric motor, said tool changing device including a rotary tool transporting wheel having at least one hole through which said tool holder extends to its working position, said plurality of transmitting means including first transmitting means arranged for transmitting the rotation of said electric motor to said rotary element so as to rotate the latter, a second transmitting means arranged for transmitting the rotation of said electric motor to said main spindle, and third transmitting means arranged for transmitting the rotation of said electric motor to said tool transporting wheel, each of said first, second and third transmitting means including a coupling arranged so that the rotation of said electric motor can be transmitted to said rotary element of said displacing means, said main spindle, and said tool transporting wheel, respectively.

2. A machine tool as defined in claim 1, wherein said first transmitting means includes a toothed belt.

3. A machine tool as defined in claim 1, wherein said rotary element is a self-locking threaded spindle having an axis and arranged in said head part rotatable about said axis and immovable in an axial direction, said displacing means further comprising a threaded nut which is arranged on said standard and through which said threaded spindle extends.

4. A machine tool as defined in claim 3, wherein said first transmitting means includes a threaded belt pulley arranged on said threaded spindle rotatable relative to the latter, a belt arranged on said threaded belt pulley and said electric motor, and the coupling of said first transmitting means being arranged between said threaded belt pulley and said spindle so as to couple the same with one another.

5. A machine tool as defined in claim 4, wherein said coupling of said first transmitting means is an electromagnetic coupling.

6. A machine tool as defined in claim 1, wherein said electric motor is formed as a servo motor with permanent electric field.

7. A machine tool as defined in claim 1, wherein said electric motor has a rotary drive shaft and is controllable in dependence upon number of revolutions of said drive shaft.

8. A machine tool as defined in claim 1, wherein said tool transporting wheel has a plurality of indexing openings, said spindle having a check plate and being axially displaceable to an initial position in which it is not driven; and further comprising a splined shaft arranged in said head part, said splined shaft having an indexing pin selectively engageable in each of said indexing opening of said tool transporting wheel, and a shoulder arranged to engage said check plate of said main spindle, the coupling of said second transporting means being arranged on said splined shaft, whereby transporting movement of said tool transporting wheel is possible only when said main spindle is in said initial position.

9. A machine tool as defined in claim 8, wherein said second transporting means includes a first gear arranged on said main spindle for joint rotation therewith, and a second gear arranged on said splined shaft rotatable relative to the latter and meshing with said first gear, said second gear being connectable with said splined shaft for joint rotation therewith via the coupling of said second transmitting means.

10. A machine tool as defined in claim 8, wherein said plurality of transmitting means includes an axially fixed drive gear rotated by said electric motor, said splined shaft being arranged in said drive gear for joint rotation therewith, but axially displaceable relative to the same.

11. A machine tool as defined in claim 10, wherein said plurality of transmitting means further includes a fourth transmitting means arranged for transmitting the rotation of said electric motor to said drive gear.

12. A machine tool as defined in claim 11, wherein said fourth transmitting means includes a toothed belt connected with said electric motor and said drive gear.

13. A machine tool as defined in claim 9, and further comprising housing means in which said first gear and said second gear of said second transmitting means are arranged, and feed drive means for displacing said housing means in the axial direction of said spindle.

14. A machine tool as defined in claim 8, wherein said tool transporting wheel has an axle, said third transmitting means including one gear arranged on said axle of said tool transporting wheel for joint rotation therewith, and another gear which is arranged on said splined shaft rotatable relative to the latter, said another gear being connectable with said splined shaft for joint rotation therewith via the coupling of said third transmitting means.

15. A machine tool as defined in claim 1, and further comprising first indicating means for indicating a position of said main spindle, and second indicating means for indicating a position of said tool transporting wheel.

16. A machine tool as defined in claim 15, wherein said first indicating means includes a first indicating element and a transmission connecting the same with said main spindle.

17. A machine tool as defined in claim 15, wherein said tool transporting wheel has an axle, said second indicating means including a second indicating element connected with said axle of said tool transporting wheel.

18. A machine tool as defined in claim 1, wherein said second transmitting means includes a coupling gear connected with said electric motor and arranged on said main spindle, the coupling of said second transmitting means including a first coupling part connectable with the tool holder, and a second coupling part connectable with said coupling gear.

19. A machine tool as defined in claim 18, wherein said electric motor has a drive gear having a plurality of inner grooves, said main spindle being formed as a splined shaft extending through and engaging with said drive gear of said electric motor.

20. A machine tool as defined in claim 19, wherein said tool transporting wheel is provided with a gear connected with the same, said coupling gear being formed as a toothed gear which engages with said gear of said tool transporting wheel.

21. A machine tool as defined in claim 20, and further comprising a hydraulic element arranged for axially displacing said main spindle together with said coupling of said second transmitting means, a housing in which said hydraulic element is arranged, and feed drive for axially displacing said housing.

22. A machine tool as defined in claim 21, wherein said feed drive for axially displacing said housing includes a spindle nut fixed in said housing, a displacing spindle extending through said spindle nut, and an electric motor for rotating said displaying spindle in said spindle nut.

* * * * *